(Model.)
E. K. GARRETSON.
BAND CUTTING AND FEEDING ATTACHMENT FOR THRASHING MACHINES.
No. 260,382. Patented July 4, 1882.
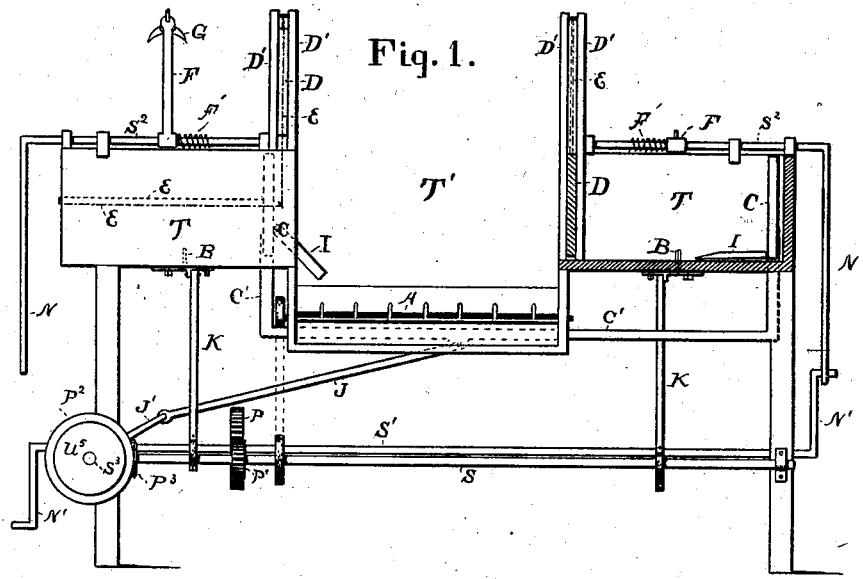
Fig. 1.
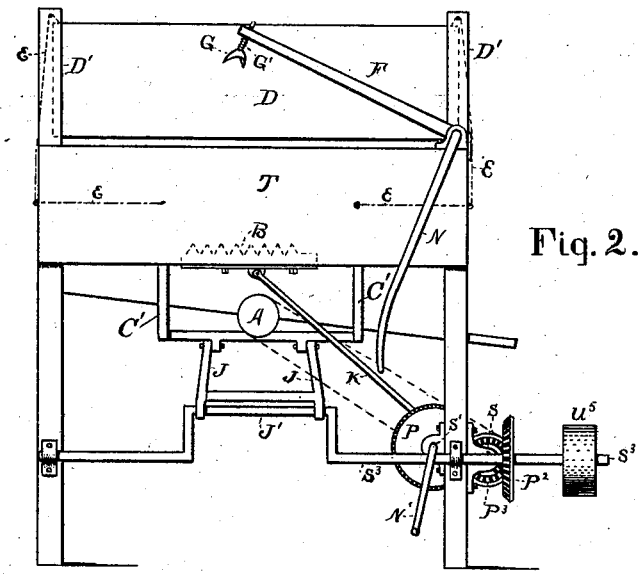
Fig. 2.
Fig. 3.
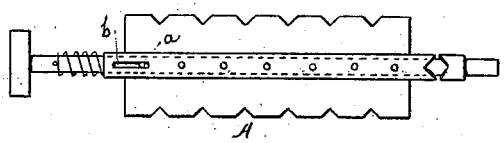
Witnesses,
H. W. Wells
J. M. Morse
Inventor,
Eli K. Garretson.
per A. B. Upham,
Attorney

UNITED STATES PATENT OFFICE.

ELI K. GARRETSON, OF DARLINGTON, INDIANA.

BAND-CUTTING AND FEEDING ATTACHMENT FOR THRASHING-MACHINES.

SPECIFICATION forming part of Letters Patent No. 260,382, dated July 4, 1882.

Application filed October 31, 1881. (Model.)

*To all whom it may concern:*

Be it known that I, ELI K. GARRETSON, of Darlington, in the county of Montgomery, in the State of Indiana, have invented an Improved Band-Cutting and Feeding Attachment for Thrashing-Machines; and I do hereby declare that the following is a full, clear, and exact description thereof, reference being had to the annexed drawings, making a part of this specification, in which like letters of reference refer to like parts, and in which—

Figure 1 represents an end elevation; Fig. 2, a side elevation; Fig. 3, view of feeder A.

The object of this invention is the construction of an attachment for thrashing-machines that shall automatically cut the bands of sheaves of grain and feed the loosened grain of the same to a thrashing-machine. Three troughs, T T T', arranged side by side, have the mechanism and construction of the two outside troughs, T T, exactly similar. The central trough, T', has its bottom inclined endwise and at a lower level than the bottoms of said troughs T. The troughs T T being alike, I will describe one only with the central trough, T'. The partition D between the troughs T and T' is vertically movable by cords E E passing over pulleys at the upper ends of the guide-bars D' D', within which said partition slides. The board or carrier C has hinged at its lower edge, on the side toward the trough T', two arms, I I, and is given by suitable mechanism a reciprocating motion from side to side of the trough T. Said arms I I are hinged to the carrier C, to enable their projecting ends to drop downward, and thus dump into the trough T' all the grain lying upon them when the carrier C has moved to the edge of the trough T, where the gate D has been raised up out of its way.

In the center of the trough T, extending lengthwise and projecting up through the floor of said trough an inch or two, there is a stationary serrated knife and a second serrated knife, B, reciprocated beside the stationary one by mechanism beneath said floor. The arm F, fixed at one end to the shaft $S^2$, and provided at its other end with a hand, G, is for the purpose of pressing down upon the knife B the band of a sheaf of grain.

A cord, E, is fastened to each upper corner of the gate D, passes thence up over a pulley or groove at the upper end of the guide-bars D', thence down through an eye near the base of said bars D', then horizontally around the outside corner of the trough T, and in through an opening in the side of said trough to the carrier C, to which its end is fastened, its other end having been attached to said gate D, as described. By means of these two cords E E the gate D is raised or lowered as the carrier C moves toward or from it.

At about the center of the sloping bottom or floor of the trough T', I extend transversely across said floor a feeder, A, having a combined rotary and vibratory motion.

The mechanism for conveying suitable motions to the said serrated knife B, carrier C, arm F, and feeder A is as follows: Power is communicated from the engine to the pulley $U^5$ on the shaft $S^3$. Said shaft $S^3$ has keyed upon it a bevel-gear, $P^2$, and is for a part of the length formed into a crank, upon which are hung rods J J. The shaft S has on it the bevel-gear $P^3$, by which an accelerated motion is derived from the bevel-gear $P^2$, the former gear-wheel, $P^3$, being considerably smaller than the latter one. Said shaft S has also upon it two eccentrics, by which, through the connecting-rods K K, a rapid reciprocating motion is imparted to the serrated knives B B in the troughs T T. The rods J J, hung upon the crank of the shaft $S^3$, connect with the frame-work C' C', by which the two carriers C C are held. The upright arms of said frame-work C' C', to which said carriers C C are fastened, extend up through slots cut clear across the floors of the troughs T T. Each rotation of said shafts $S^3$ causes, therefore, through its crank, the rods J J, and frame-work C' C', each carrier C to move from the side of its trough up to the edge of the trough T' and back again. As the carriers are fastened to the same frame-work, C' C', they of course move at the same time, and when one of said carriers C is at the side of its trough T near the edge of the trough T' the other carrier C is at the opposite side of its trough T. A small spur-gear wheel, P', upon the shaft S meshes with the larger spur-wheel, P, upon the shaft S', to transmit thereto rotation simultaneous with that of the shaft $S^3$.

The object in making the revolutions of the shafts S' and S³ simultaneous is that the reciprocating movement transmitted from said cranked shaft S³ through the rods J J to the carrier C may occur at intervals of time equal to the vibrations of the arm F, given thereto through the arm N and crank N' upon the said shaft S', and thereby cause the downward movement of said arm F to begin as soon as the carrier C has come into position to receive another sheaf of wheat.

At each end of the shaft S' is a crank, N', which during its revolution comes against the extremity of one of the arms N depending from the shafts S², there being two of said arms N, one for each of the two shafts S². Said cranks N' are set at opposite sides of the center line of their shaft S', that the vibratory motions which they communicate to the arms N shall be alternate. The arms F being fastened to the shafts S², every time that the cranks N' come around and move the arms N through their quarter-turn said arms F vibrate downward from a nearly vertical position till their hands G approach within a few inches of the serrated knives B. The arms N are then left by the cranks N', and the coiled springs F' turn the shafts S², with arms N and F, back to their former positions.

The hands G have, by means of a wrist and spring G' to each, sufficient play to prevent undue strain upon the arms F from an extra-thick sheaf of grain.

The feeder A has two flat notched fans fastened at opposite sides of a tubular axle, and has also projecting from said axle at right angles to said fans two series of pins. A shaft having upon it a driving-pulley is put through the hollow axle, to communicate a rotary motion thereto by means of a pin, $a$, entering it and a slot, $b$, in said tubular axle. The end of said axle being cam-shaped and pressed by a spring against cam-shaped bearings, the feeder A is caused to reciprocate in the line of its axis while revolving. Power is communicated to its driving-pulley by a belt or cord from a pulley upon the shaft S.

The operation of this machine is as follows: The carrier C of one of the troughs T being at its farthest position from gate D of said trough, said gate D being therefore down and arm F at point of descending, a sheaf of grain is thrown into said trough T. The arm F then comes downward, its hand G presses the sheaf upon the knife B till the band of said sheaf has been severed, and then said arm F is thrown back up into position by its spring F'. The carrier C now advances toward the central trough, T', carrying with it the loosened grain, while at the same time the gate D is rising. When said carrier reaches the edge of its trough its arms I I turn downward and dump the grain down into the trough T', where, by the action of the feeder A, it is still further loosened and moved onward toward the thrashing-machine. The carrier C of the other trough T is now in position to receive a sheaf of grain, and advances toward the central trough, T', to dump it, while the first-described carrier returns to receive another supply of grain. By thus having an alternating double supply of unfastened grain to the central trough, T', a continuous stream is furnished to the thrashing-machine.

What I claim as my invention, and for which I desire Letters Patent, is as follows, to wit:

1. In a band-cutting and feeding attachment for thrashing-machines, the combination of the trough T, vertically-movable gate D, the carrier C, knife B, arm F, means for operating them, the trough T', and feeder A, substantially as set forth.

2. The trough T, vertically-movable gate D, the carrier C, having arms I I, frame-work C', the cranked shaft S³, connecting-rods J, serrated knife B, and vibratory arm F, in combination with the trough T' and feeder A, substantially as and for the purpose specified.

3. The trough T, carrier C, gate D, cords E E, the vibratory arm F, the serrated reciprocating knife B, the stationary serrated knife, the rod K, and the shaft S, having eccentrics, in combination with the trough T' and feeder A, substantially as and for the purpose set forth.

4. The trough T, gate D, carrier C, knife B, arm F, the shaft S², the arm N, the crank N', the shaft S', and the spring F', in combination with the trough T' and feeder A, substantially as set forth.

In testimony that I claim the foregoing invention I have hereunto set my hand this 26th day of October, 1881.

ELI K. GARRETSON.

Witnesses:
J. Q. MIKLER,
W. H. JOHNSTON.